Nov. 12, 1968          P. E. KETTLER          3,410,599
                        TRACTOR CABINS
Filed May 23, 1966                        6 Sheets-Sheet 3
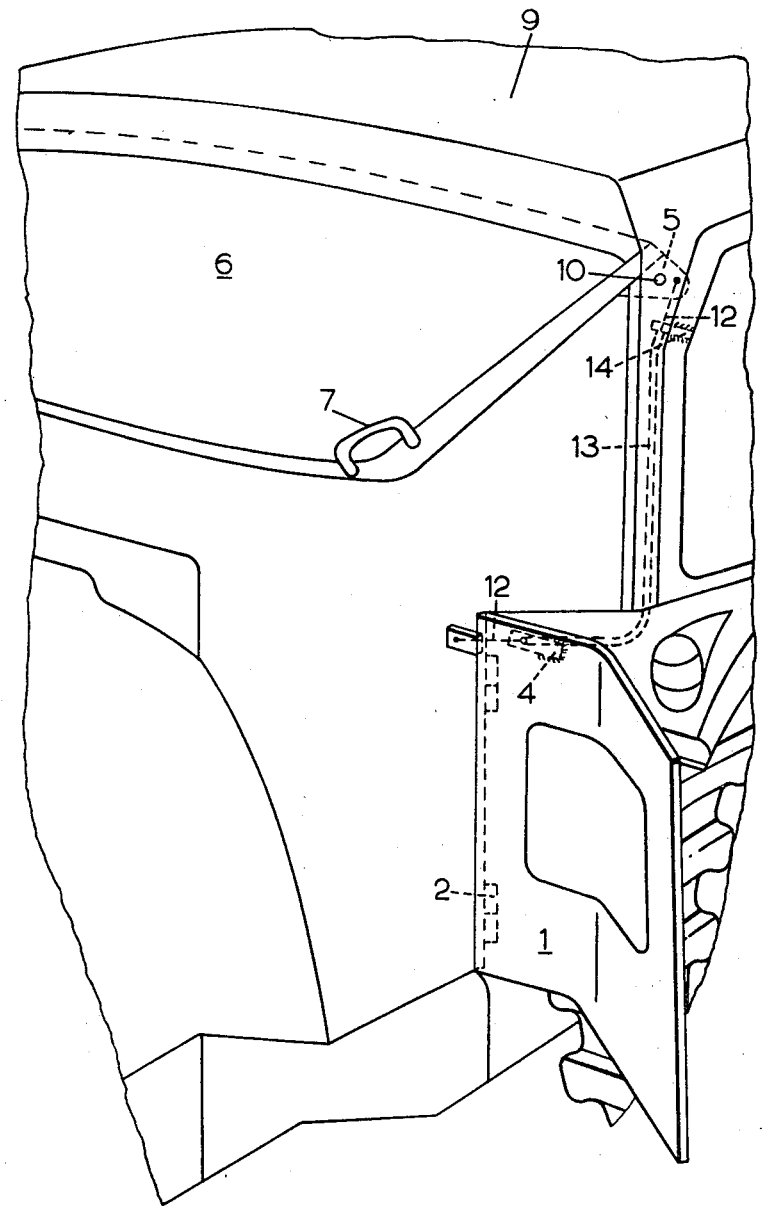
INVENTOR:
PAUL E. KETTLER
BY
Imrie v Smiley
Attys.

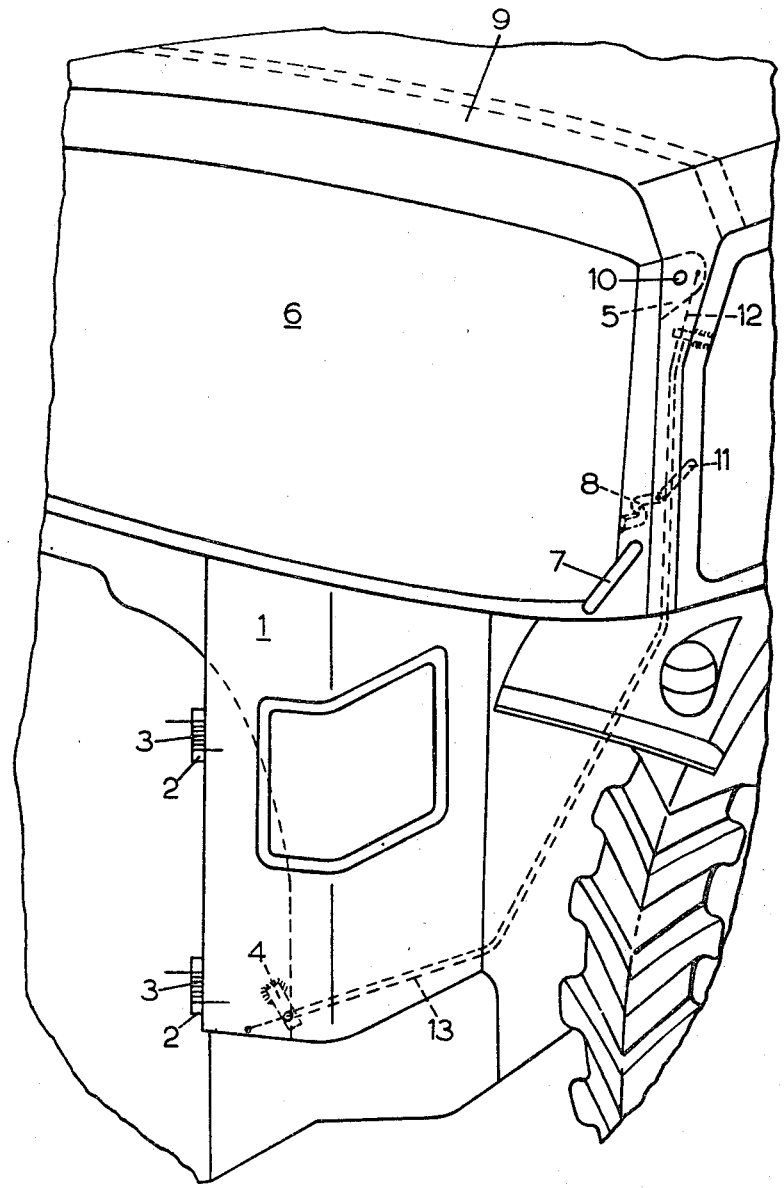

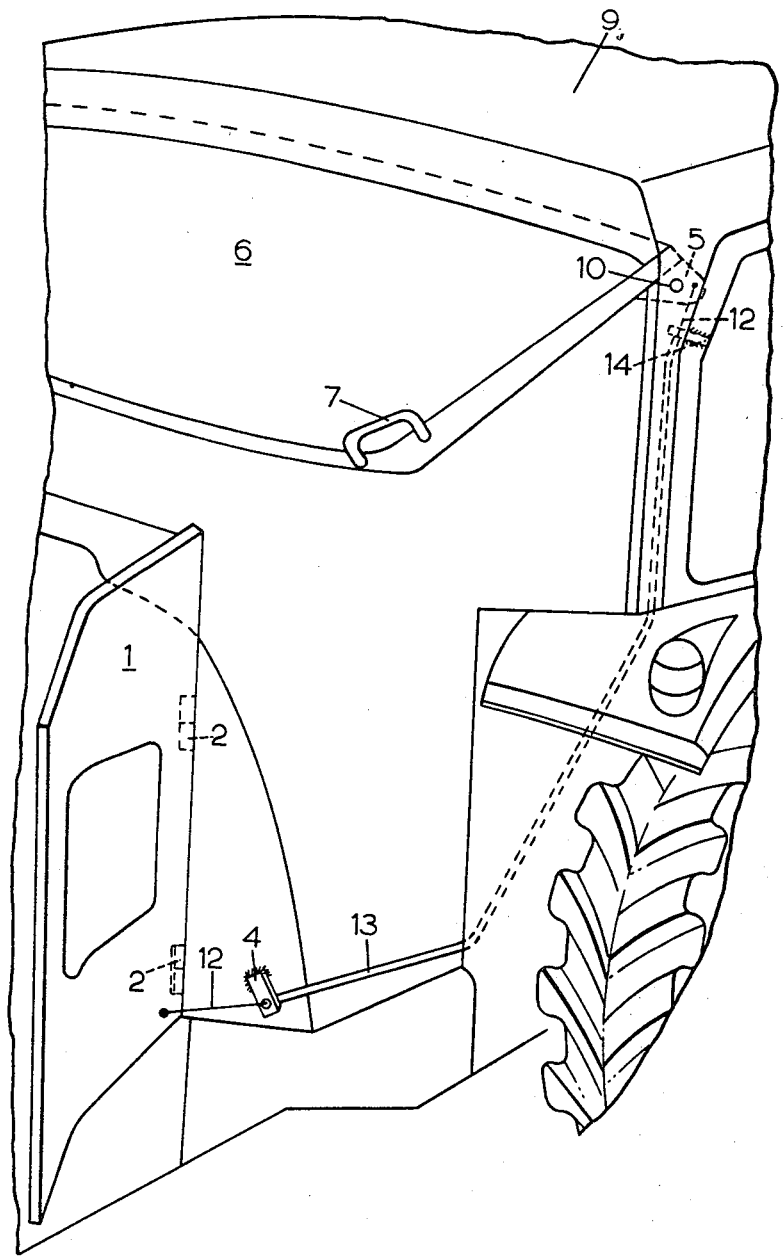

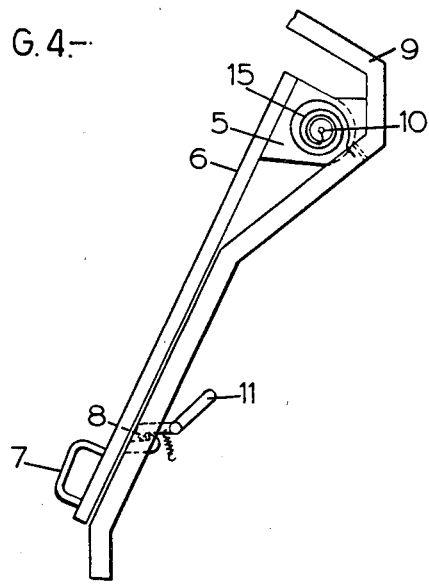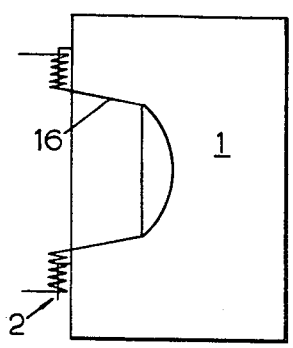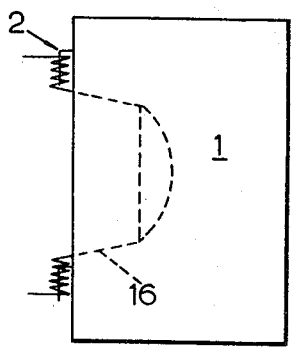

Nov. 12, 1968 P. E. KETTLER 3,410,599
TRACTOR CABINS
Filed May 23, 1966 6 Sheets-Sheet 5
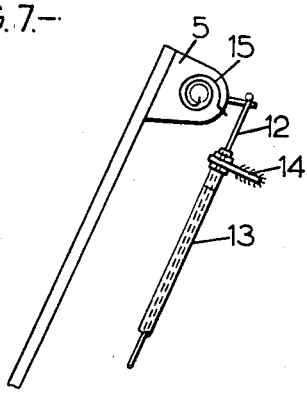
-FIG.7.-
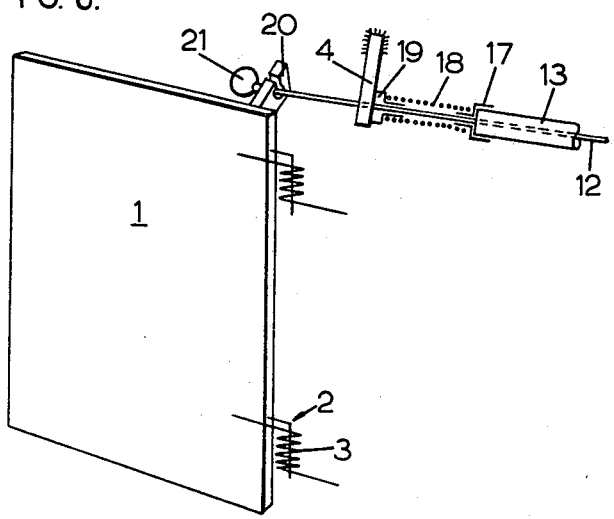
-FIG. 8.-
INVENTOR:
PAUL E. KETTLER
BY
*Inscice + Smiley*
ATTYS.

United States Patent Office 3,410,599
Patented Nov. 12, 1968

3,410,599
TRACTOR CABINS
Paul Erich Kettler, Ockstadt, Kreis Friedberg,
Hesse, Germany
Filed May 23, 1966, Ser. No. 552,221
Claims priority, application Germany, June 10, 1965,
K 56,346
6 Claims. (Cl. 296—28)

ABSTRACT OF THE DISCLOSURE

The invention is for a tractor cabin which has a front protection panel member and a leg guard member each of said members being supported for movement between an open and a closed position. A force applying means such as a spring or weight acts on at least one of said members to urge it into its open position. A force transmitting means operatively connects the front panel member and the leg guard member together so that a closing force applied to one of said members is transmitted to the other member to effect closing thereof. Conveniently the force transmitting means is a Bowden wire mechanism or a hydraulic force transmitting device. The force transmitting means may include a compensating device which is operative to permit differential movement between the front protection panel member and the leg guard member, said compensating device including a resilient longitudinally adjustable element.

---

Figure 9:
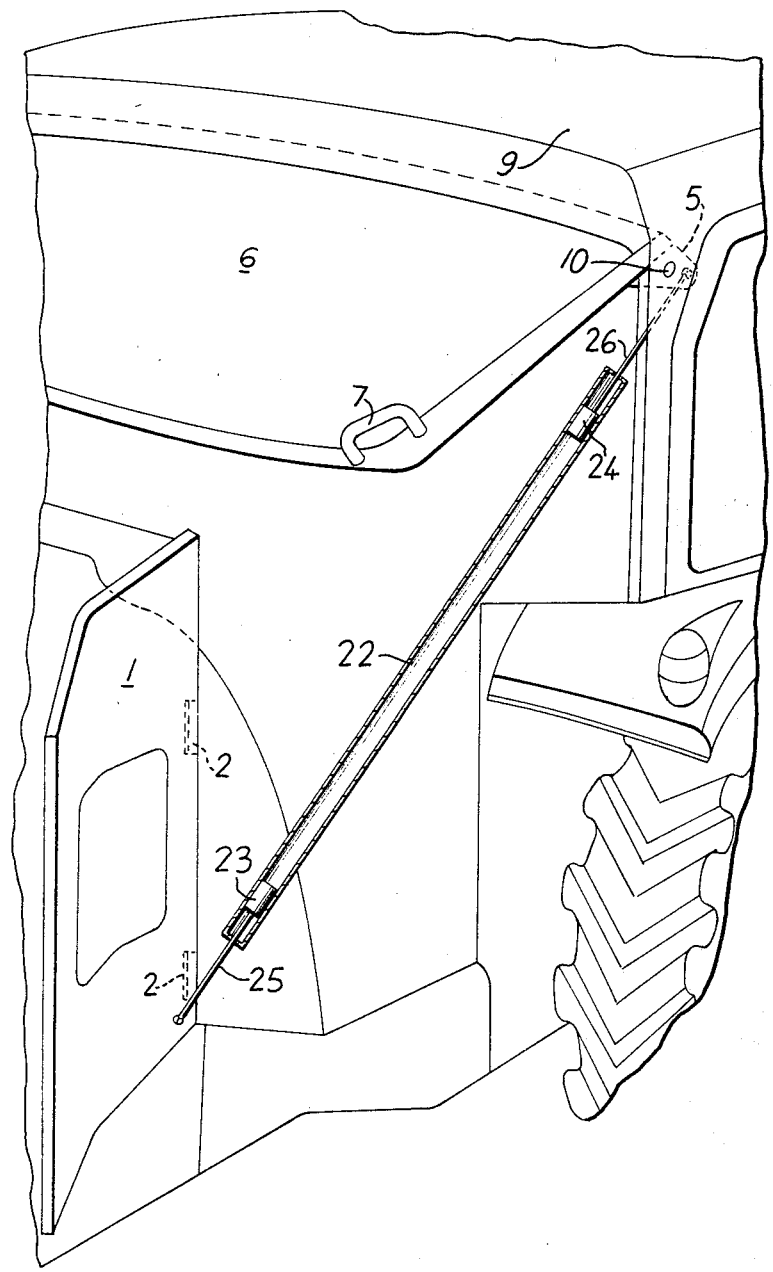

This invention is for improvements in or relating to tractors and like self-propelled vehicles (hereinafter referred to as a tractor) and is more specifically concerned with the construction of tractor cabins.

Tractor cabins are already known which provide for front entry or mounting of the driver. In this connection may be mentioned those constructions having a multi-part front panel the side portions of which pivot about a vertical axis like a door, and other constructions in which the front panels open upwardly, partly by pivoting upwardly about a horizontal upper pivotal axis, and partly by a sliding movement. These embodiments serve essentially to enable the driver of the tractor to mount from the front.

In these prior constructions, in which a multi-part front panel is present, the range of vision of the driver, in consequence of the essential framework of the front panel portion and the joints associated therewith, is restricted.

In recent times tractor cabins, designed to provide protection from the weather, have been produced with front panels which pivot upwardly about an upper horizontal axis. The essential front shield or leg guard for closing the space between the cabin and the engine casing as well as the space between said casing and the mud-guards has generally been made from flexible material. This front guard is commonly mounted on tubes or like elements which lie below the front protection panel. For front entry into such cabins the front panel is swung up and a portion of the tubular frame carrying the front shield is so pivoted that an opening results, between the engine and the mud-guard, through which the driver can mount the tractor.

Furthermore, in this type of cabin the front or leg guard can be wholly or partially removed so far as this is requisite for adaption to the existing weather and working conditions.

A front guard of flexible material, especially of textile material, has the disadvantage that the flexible material can be damaged or displaced by wind and must be secured at numerous positions on the tractor or the carrier frame in order to attain a weather-tight closure. Furthermore, the flexible window pane or panes inserted in the front shield of textile material permit no extensive vision especially of the front wheels of the tractor and laterally between the fore and rear wheels. It is possible to avoid these disadvantages to some extent by making the front shield or guard wholly or partially of door-like form. In order, however, to obtain a neat contour-closure and trouble-free sealing it is essential to provide the part constructed in door-like form with special bolting devices. This has the disadvantage that at each time on dismounting from or mounting onto the tractor an actuation of the bolting devices of the front panel and also of the front guard is necessary. This is particularly burdensome having regard to the fact that where the tractor has certain implements attached to it the driver may have to mount and dismount up to 400 times in one working day.

An object of the present invention is to reduce the time required to open and close the front entry means of a tractor and thereby make less irksome the frequent mounting of and dismounting from the tractor.

According to the present invention there is provided a tractor including a cabin having a front protection panel and a leg guard each movable between an open and closed position wherein the front panel and the leg guard are operatively connected together for movement of one by the other. The operative connecting means may, for example, be a Bowden wire mechanism or a lever, rod, chain, cable or hydraulic arrangement.

In this way there is attained that for opening or closing of the mounting opening only the actuation of the front panel or of the leg guard is necessary.

Conveniently the arrangement is such that for opening of the front panel only one bolting lever or like fastening member has to be actuated and a spring means then acts automatically to move both the front panel and the leg guard to the full open position.

Conveniently the front panel lies in front of and covering the leg guard.

Preferably the front or leg guard is brought to the closed position against an abutment in the form of packing or jointing, which is preferably adjustable and resilient, so that a tight closure results and a particularly secure fastening of the leg guard in the closed position is not required.

Within the basic concept of the invention, namely, a positive coupling of the motion of the leg or front guard and the front panel, it is possible to effect the opening or closing of the mounting opening by spring means, said spring means being arranged either on the front panel or on the leg guard or alternatively on both these parts. It is also possible to arrange springs on both these parts so that the springs effect an opening movement of one part and a closing movement of the other part. The pivotal point of the leg or front guard can be arranged on the front side and on the engine cover or casing as well as at the rear side and on the mud-guard.

It is preferable, in the operative connection between the front panel and leg guard, to incorporate compensating parts especially springs. In this way compensation is provided for differences which result from the fact that the front panel and the leg guard include differing angles between their extreme positions, so far as this is not sufficiently taken care of by corresponding adjustment of the transmission ratios, so that movements take place in differing time sequences, and by finishing and mounting inaccuracies according to the size and type of tractor.

The arrangement may be such that the operative connection between the front panel and the leg guard can be temporarily interrupted so that these two parts can be moved independently one from the other. This is especially convenient when it is desired to remove one of the two parts, in particular the front guard, in suitable weather conditions.

Some embodiments of the invention are illustrated, by way of example, in the accompanying drawings wherein:

FIGURE 1 is a perspective view of a portion of a tractor having a front protection panel and leg guard both of which are in the closed position, FIGURE 2 is a view similar to FIGURE 1 but with the front protection panel and leg guard in the open position, FIGURE 3 shows a modification of FIGURES 1 and 2 in which the leg guard hinges outwardly, FIGURE 4 shows diagrammatically a spring biasing arrangement for the front panel, FIGURES 5 and 6 show diagrammatically two alternative spring biasing arrangements for the leg guard, FIGURE 7 shows diagrammatically a further construction of the front panel, FIGURE 8 shows diagrammatically a further construction of the leg guard, and FIGURE 9 is a view similar to FIGURE 2, but diagrammatically illustrating an alternative arrangement for connecting and operating the front panel and leg guard.

The tractor shown in FIGURE 1 has a leg guard 1 pivotally mounted on hinges 2. By means of coil springs 3 the leg guard 1 is biased into its closed position. Alternatively the spring 3 may bias the leg guard into its open position. The stop or abutment for a Bowden cable mechanism, to be later described is indicated by reference numeral 4. The front panel or window 6 has a hand grip 7 and is provided on both sides with flanges 5 by which it is pivoted at 10 for upward opening movement from the closed position shown in FIGURE 1. For securing the front panel 6 in its closed position there is provided a clasp fastening device 8. The pivots 10 which are in the form of bolts are carried by the cabin frame or arch 9. The frame or arch 9 is secured in known manner on the tractor.

FIGURE 2 shows the front panel 6 and the leg guard 1 in the opened position.

For the operative connection together of the front panel and the leg guard a Bowden mechanism is used, the casing or sheath of which is indicated by reference numeral 13 and the cable by reference numeral 12. The Bowden casing 13 is secured at its lower end to the stop 4 and at its upper end to the stop 14, said stops being on parts connected immovably with the tractor. The Bowden cable 12 is secured at its lower end to the leg guard 1 and at its upper end to the pivotal flange 5 of the front panel 6 to one side of the actual pivot.

In the embodiment according to FIGURE 3 the leg guard 1 is not, as in FIGURES 1 and 2 pivotally secured at its front side on the engine casing of the tractor, but with its rear side pivoted on the rear mud guard of the tractor. The arrangement of the lower stop 4 for the Bowden casing 14 and of the lower end of the Bowden cable 12 are appropriately altered, in contrast to FIGURES 1 and 2, as shown.

FIGURE 4 shows the provision of an opening spring arrangement on the front panel 6. In this arrangement a coil spring 15 is positioned against the pivotal flange 5 of the front panel 6 the inner part of the coil spring being connected with the bolt 10 which serves as the fixed pivot member for the panel. The coil spring 15 is tensioned and lies with its outer end against the tractor frame member or arch 9, the spring 15 being stressed so as to urge the front panel 6 into its open position. When the front panel 6 is brought into its closed position, against the action of the spring 15, it is secured in this position by the clasp 8. When the front panel 6 is in its closed position the leg guard 1 is likewise in the closed position. In the closed position the leg guard 1 is either held by the spiral spring indicated in FIGURE 1 by reference numeral 3 or by the hairpin spring indicated by reference numeral 16 in FIGURE 5. The ends of the hairpin spring are held in a fixed part of the tractor and the curved central portion of said spring lies against the leg guard.

In a modification the spring 15 is arranged to urge the front panel 6 into the closed position. Similarly the hairpin spring 16 may be arranged (see FIGURE 6) so that it urges the leg guard 1 into the open position.

The hairpin spring arrangement makes it readily possible to take the spring pressure off the leg guard 1 and then to unhinge the leg guard from its hinge 2 and remove it from the tractor. Likewise it is readily possible to rehang the leg guard 1 again on the tractor.

In FIGURES 7 and 8 a preferred connection of the front panel 6 and the leg guard 1 by means of a Bowden mechanism is diagrammatically illustrated. The cable 12 running in the casing or sheath 13 is connected with the flange 5 on the front panel 6. This connection is preferably so formed that a stop, secured at the end of the Bowden cable 12, is supported against the pivotal flange 5 or against a fixed part or element thereon. The securing of the Bowden cable 12 to the flange 5 or the element connected therewith can be releasably constructed. For example the cable 12 can be let into a slot in the flange 5 or the element secured thereon. The coil spring 15 is stressed to rotate the front panel 6 upwardly into its open position. The devices serving for securing the opening panel 6 in its closed position, indicated by reference numerals 8 and 11 in FIGURE 4, are not shown in FIGURE 7.

In FIGURE 8 the leg guard 1 is shown in its closed position. The Bowden cable 12 is provided at its lower end with an enlargement 21 which serves as a stop and is releasably connected with a slotted stop 20 secured on the leg guard 1. The Bowden casing 13 is supported against a stop 4 which is secured to a fixed part of the tractor or its cabin. The support takes place however not directly but through two intermediate members 17, 19 and a compensating spring 18. By suitable dimensions of the length of the intermediate members 17, 19 and the length and force of the compensation spring 18 it is possible to adapt to particular requirements both the pivotal angle of the front protection panel 6 and the pivotal angle of the leg guard 1 as well as the relative movements of these parts. By detaching part 21 and the cable 12 from the stop 20 it is possible to interrupt temporarily the positive and operative connection between the front panel 6 and the leg guard 1.

Springs 3, 15 and 16 can serve for the purpose and be so constructed that under the action of spring force the front panel 6 and the leg guard 1 are brought either into the open position or the closed position. When the first situation is the case then the tractor driver after mounting the tractor either actuates the front panel 6 or the leg guard 1 in such a way that both parts attain the closed position and are held in the closed position by the fastening clasps 8 on the front protection panel 6. A corresponding fastening clasp can be arranged on the leg guard 1. Before dismounting from the tractor the fastening clasp 8 is released by actuation of the hand grip 11 and the front protection panel 6 and the leg guard 1 then move under the action of the spring means to the open position.

In the alternative arrangement of the springs 3, 15 and 16 (i.e. when they are arranged to bias the panel 6 and leg guard 1 to the closed position) to dismount from the tractor the tractor driver pushes the front panel 6 upwardly or the leg guard 1 outwardly the part not so pushed being moved by the other part. The tractor driver can then dismount. For remounting of the tractor a corresponding actuation takes place either of the front protection panel 6 or the leg guard 1. These may be provided on the front protection panel 6 or the leg guard 1 arresting devices which secure these parts in the open position.

The leg guard may be mounted at an angle on the vehicle so that in consequence of gravity when moved to the open position it remains in said position and also holds the front protection panel 6 in its open position.

Means may be provided for adjusting the force of any of the spring devices incorporated in the mechanism above described.

The leg protection guard 1 may be made from sheet metal or it may comprise a frame which is covered with plastics-coated textile material. Some parts of the frame may be omitted provided that the plastics-coated texile material is sufficiently stiff.

In the embodiment of the invention shown in FIGURE 9 the Bowden wire arrangement is replaced by a hydraulic tube 22 which is shown diagrammatically as extending directly between the leg guard member 1 and the pivotal flange 5 of the front panel member 6. For purposes of illustration pistons 23 and 24 are shown in the respective end portions of the tube 22 and having piston rods 25 and 26 respectively connected to the member 1 and the flange 5.

I claim:

1. A tractor including a cabin having a front protection panel member and a leg guard member, means supporting each of said members for pivotal movement between an open and a closed position, force applying means acting on at least one of said members to urge it into the open position and force transmitting means operatively connecting the front panel member and the leg guard member together for transmitting force applied to one of said members to the other of said members.

2. A tractor as claimed in claim 1 wherein the force transmitting means between the front protection panel member and the leg guard member is a Bowden wire mechanism.

3. A tractor as claimed in claim 1 wherein the force transmitting means between the front panel member and the leg guard member is a hydraulic force transmitting device.

4. A tractor as claimed in claim 1 wherein the force transmitting means between the front panel member and the leg guard member is releasably connected to at least one of said members.

5. A tractor as claimed in claim 1 wherein the force transmitting means between the front protection panel member and the leg guard member includes spring means and wherein means is provided for adjusting the force of said spring means.

6. A tractor including a cabin having a front protection panel member and a leg guard member, means supporting each of said members for movement between an open and a closed position, force applying means acting on at least one of said members to urge it into the open position and force transmitting means operatively connecting the front panel member and the leg guard member together whereby a closing force applied to one of said members is transmitted to the other of said members to effect closing thereof, said force transmitting means including a compensating device operative to permit differential movement between the front protection panel member and the leg guard member, said compensating device including a resilient longitudinally adjustable element.

References Cited

UNITED STATES PATENTS

| | | | |
|---|---|---|---|
| 618,039 | 1/1899 | Lawrence | 296—146 |
| 2,124,333 | 7/1938 | Duff et al. | 49—40 |
| 2,464,696 | 3/1949 | Lelong | 49—36 |
| 2,938,749 | 5/1960 | Podolan et al. | 296—146 |
| 2,993,730 | 7/1961 | Weiertz | 296—146 |
| 3,136,576 | 6/1964 | Curtin | 296—146 |

FOREIGN PATENTS

| | | |
|---|---|---|
| 609,391 | 11/1960 | Canada. |
| 31,213 | 9/1936 | France. |
| | | (1st addition to No. 606,060) |

BENJAMIN HERSH, *Primary Examiner.*

J. A. PEKAR, *Assistant Examiner.*